United States Patent [19]

Matsuyama et al.

[11] Patent Number: 5,796,095
[45] Date of Patent: Aug. 18, 1998

[54] OPTICAL APPARATUS HAVING AN AREA SENSOR WITH A COARSE PICTURE ELEMENT PITCH AND FINE PICTURE ELEMENT PITCH

[75] Inventors: Shinichi Matsuyama, Tokyo; Takashi Kawabata, Yokohama, both of Japan

[73] Assignee: Canon Kabushiki Kaisha, Tokyo, Japan

[21] Appl. No.: 901,332

[22] Filed: Jul. 28, 1997

Related U.S. Application Data

[63] Continuation of Ser. No. 663,539, Jun. 13, 1996, abandoned.

[30] Foreign Application Priority Data

Jun. 19, 1995 [JP] Japan .................. 7-173919

[51] Int. Cl.$^6$ .................................. H01J 40/14
[52] U.S. Cl. .................................. 250/208.1
[58] Field of Search .................. 250/208.1, 208.2, 250/214.1, 214 R, 339.02; 396/111, 115; 358/451, 453

[56] References Cited

U.S. PATENT DOCUMENTS 4,691,242  9/1987  Kato ............................. 250/214.1
5,258,618  11/1993  Noble ............................ 250/338.4

FOREIGN PATENT DOCUMENTS 4-277713  10/1992  Japan .

*Primary Examiner*—Que Le
*Attorney, Agent, or Firm*—Fitzpatrick, Cella, Harper & Scinto

[57] ABSTRACT

An optical apparatus includes area sensors which are made to differ in picture element pitch between the central portions and the marginal portions thereof (the marginal portions are made to have a coarse picture element pitch since it is not very meaningful even if the picture element pitch is made fine because the performance of an optical system is limited, and the central portions are made to have a dense picture element pitch) and the changeover of the respective picture elements is electronically effected by reading-out means so that two kinds of object field information (detailed information and coarse information) may be obtained from the area sensors.

11 Claims, 4 Drawing Sheets

OPTICAL APPARATUS HAVING AN AREA SENSOR WITH A COARSE PICTURE ELEMENT PITCH AND FINE PICTURE ELEMENT PITCH

This application is a continuation of application Ser. No. 08/663,539, filed Jun. 13, 1996, now abandoned.

BACKGROUND OF THE INVENTION

1. Field of the Invention

This invention relates to improvements in an object field recognizing area sensor such as a CCD for obtaining object field information and an optical apparatus using the sensor.

2. Related Background Art

Heretofore, a sensor for obtaining object field information for use in auto focus or the like has been disposed correspondingly to an image field to be photographed through a photo-taking lens to pay regard to a user's framing operation, and the information in this image field has been obtained.

Also, in a compact photographing apparatus, an example designed such that information corresponding to the photographing angle of field is obtained by the area changeover of an operatively associated optical system or a sensor for a photoelectric conversion element disposed near a photographing optical axis for the convenience of disposition of the sensor has been seen among photoelectric conversion elements for photometry. However, in the case of a photoelectric conversion element which requires a highly accurate optical system such as auto focus, an interlocking zoom mechanism has been difficult in terms of accuracy and photoelectric conversion information has also been unusable in terms of accuracy because an error of the information is produced in rough selective interlocking such as changeover. There has also been a construction as disclosed in Japanese Laid-Open Patent Application No. 4-277713 wherein two lines of distance measuring optical systems are used in the central portion and the marginal portion and sensors and pitches are made different so that the central portion may effect detailed measurement at a fine pitch and the marginal portion may obtain schematic information at a coarse pitch.

Image information passed through a photo-taking lens has suffered from the disadvantage that the area which can be measured highly accurately is limited. That is, even if a complete optical system is used, such area is limited to an area of the present zoom angle of field and the surrounding situations cannot be known at all and to grasp the state of the object field, it is necessary to zoom for a field of wide angle each time, and this can be said to be impractical. Also, regarding the marginal portion, the actual optical system suffers from a reduction in the quantity of marginal light, and there has been the disadvantage that it is difficult to construct a symmetrical optical system for the marginal portion to construct a distance measuring optical system.

In a case where image information is not passed through the photo-taking lens, it is necessary to obtain both of the information of a wide field of view and the detailed information adjusted to the time of telephoto photographing, and a uniform construction has not matched both purposes.

Also, in the two lines of optical systems as in Japanese Laid-Open Patent Application No. 4-277713, two lines of signals are seeing different positions (angles of field) and with the parallax between the two lines, a difference occurs between two images, and this has led to the disadvantage that for example, to which portion of a fine image the central portion of a coarse image corresponds becomes indefinite and the interpretation of the-object field becomes different.

SUMMARY OF THE INVENTION

It is the object of the present invention to provide an object field recognizing sensor and an optical apparatus which can obtain a desired one of two kinds of object field information while preventing the generation of noise.

To achieve the above object, the present invention is provided with an object field recognizing area sensor comprising a plurality of picture elements (pixels) and in which the picture element pitch of the central portion is made denser than the picture element pitch of the marginal portion. The sensor also has a pair of optical systems disposed with a predetermined base length for directing a light beam to the object field recognizing area sensor, and reading-out means for reading out two kinds of information from the object field recognizing area sensor. The sensor further includes zoom information calculating means for controlling the reading-out means to use the picture elements of the marginal portion and each picture element of the central portion of the object field recognizing area sensor as a picture element during a wide angle operation, to thereby obtain the coarse information of the object field from these, and controlling the reading-out means to use each picture element of the central portion during a telephoto operation, to thereby obtain detailed information from these, and calculate zoom information, and the area sensor is made to differ in picture element pitch between the central portion and the marginal portion (the marginal portion is made to have a coarse picture element pitch because it is not very meaningful even if the picture element pitch is made fine because the performance of the optical systems is limited, and the central portion is made to have a dense picture element pitch) so that the changeover of each picture element may be electronically effected by the reading-out means to thereby obtain two kinds of object field information (detailed information and coarse information) from the area sensor.

DESCRIPTION OF THE PREFERRED EMBODIMENTS

Figure 1:
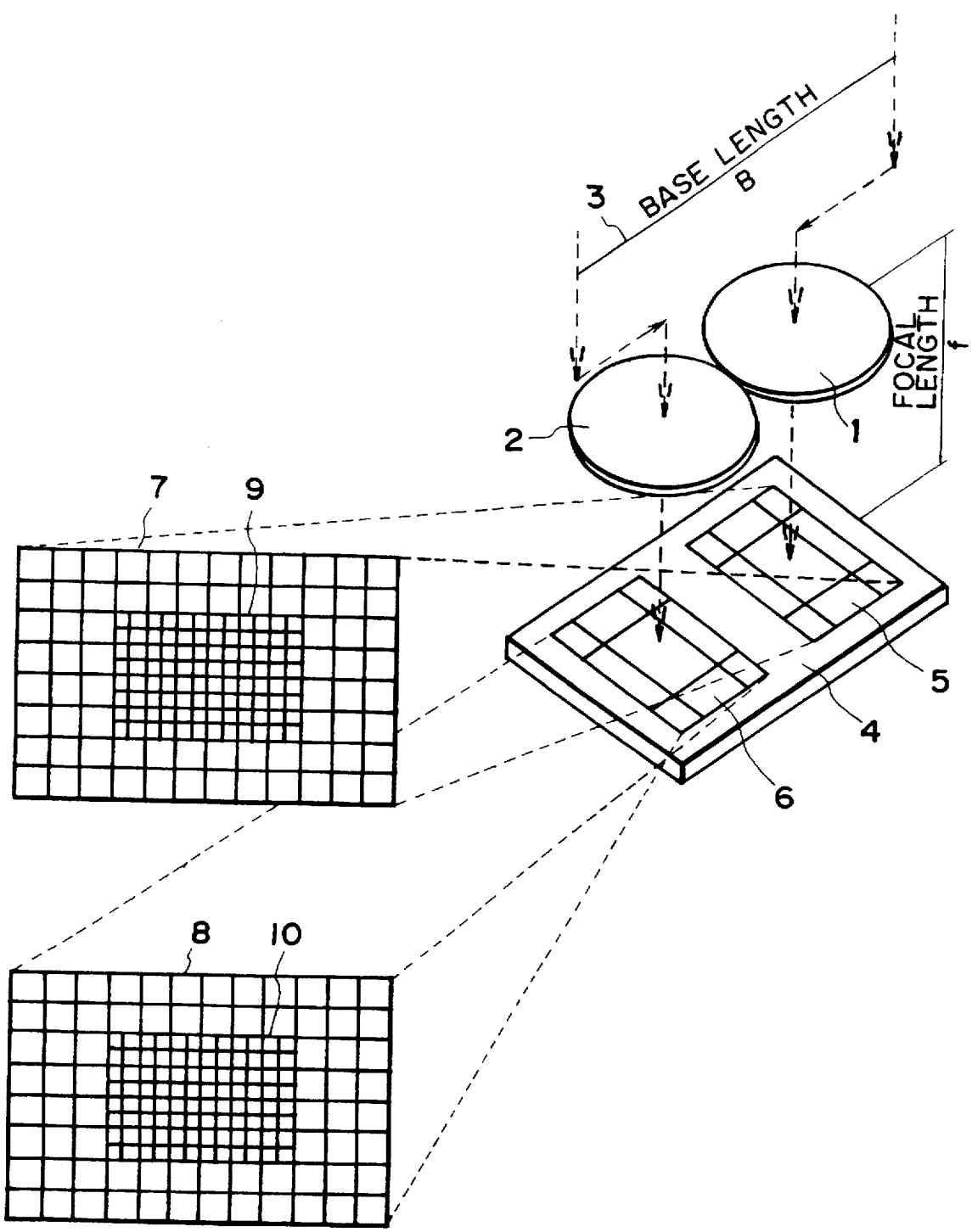
FIG. 1 is a perspective view showing an optical path according to an embodiment of the present invention.

The invention will hereinafter be described in detail with respect to some embodiments thereof shown in the drawings.

FIG. 1 shows a first embodiment of the present invention, which will hereinafter be described.

An object field image from a location distant by a predetermined base length B may be formed on photoelectric converting portions 5 and 6 on a sensor 4 by objective lenses 1 and 2. Up to this point, the system is the same as the distance measuring system of the popular two-image coincidence type (the outer measurement deviation type), but the present embodiment is of such a shape that the photoelectric converting portions 5 and 6 is of a mixture of large compartment sensor portions of a wide area (i.e., a wide field of view) as indicated at 7 and 8, and small compartment sensor portions of a narrow area (i.e., detailed picture element) as indicated at 9 and 10 in the central portions thereof.

As a manner of use, the large area (wide field of view) may be photoelectrically converted by the large compartment sensor portions 7 and 8 and the central portion (narrow field of view) may be photoelectrically converted by the small compartment sensor portions 9 and 10, whereby the sensor may be used both for the study of the object field in a wide field of view and for detailed study in a narrow field of view.

Description will now be made of the changeover of the reading-out of data (image signal) which is characteristic.

Figure 2:
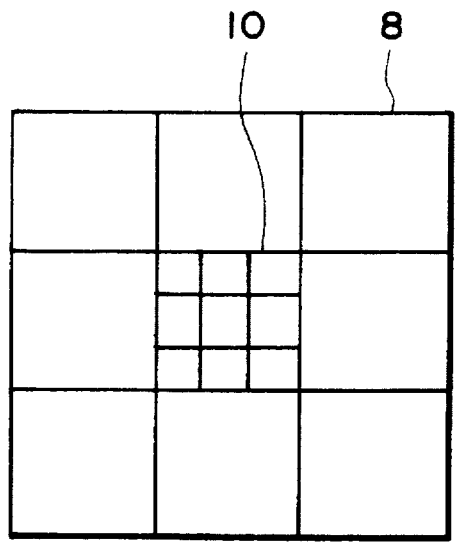
FIG. 2 is a schematic view of the sensor of FIG. 1.

FIG. 2 is a schematic view of the sensor, and when the wide field of view is to be read out (with the central fine section as information collected into one), it may be read out as data of "3×3", and the fine section information in the small compartment sensor portion 10 may be read out as the narrow field of view for telephoto.

Figure 3:
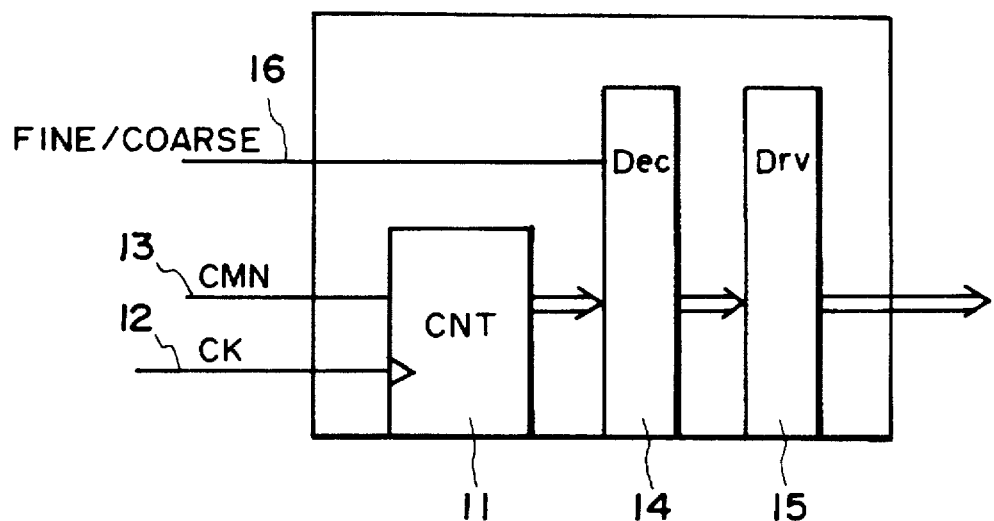
FIG. 3 is a view for illustrating the reading-out control when an MOS type sensor is used as the sensor of FIG. 2.

FIG. 3 is a view for illustrating the reading-out control in the case of an MOS type sensor.

On the basis of a clock (CK) passed through a line 12, a reading-out command (CMN) passed through a line 13 may be counted as a coefficient by a counter 11 (in the example of FIG. 2, up to "9"), and respective gates in the wide field of view may be successively controlled by a decoder portion 14, and the nine gates in the small compartment sensor portion 10 are operated as such a single gate, whereby the central compartment is handled like a picture element. The reference numeral 15 designates a driver for driving.

When detailed (telephoto) reading-out is to be effected, operation is performed by a signal (fine/coarse) passed through a line 16 so that inside (small compartment) nine gates only may be opened and closed by a coefficient to thereby change over the correspondence between a wide angle and telephoto.

Figure 4:
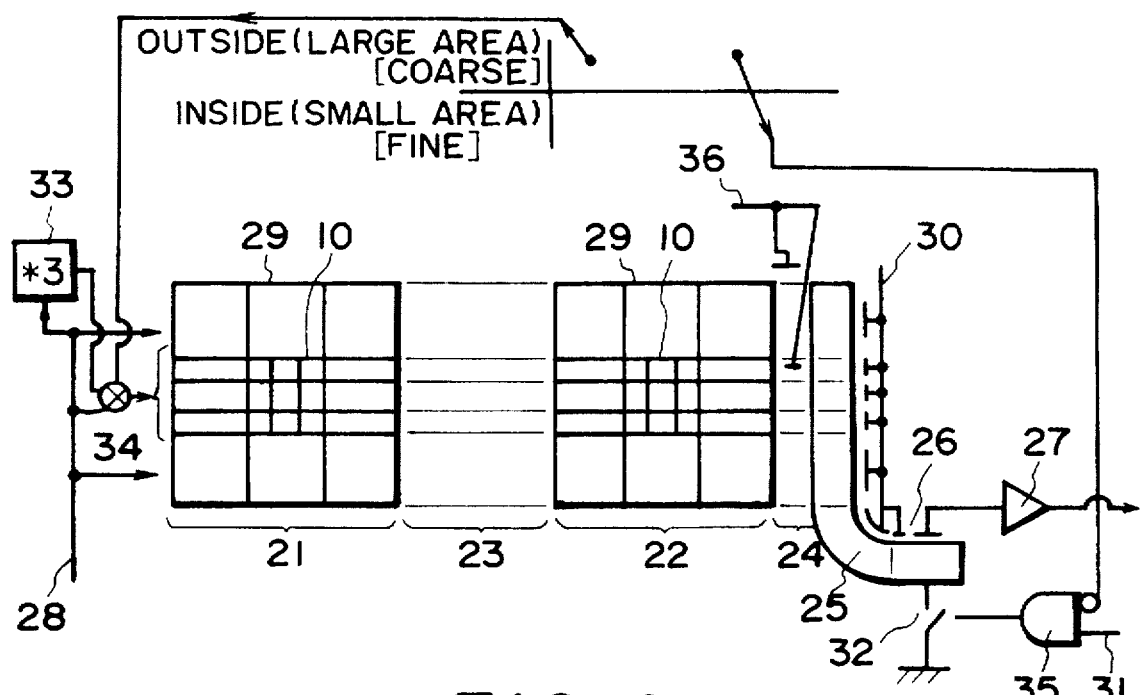
FIG. 4 is a view for illustrating an example of the reading-out control when a CCD is used as the sensor of FIG. 2.

FIG. 4 shows a case where the sensor is a CCD, and in this case, a reading-out transfer path is not independent and therefore, the division of the transfer path becomes necessary.

When photoelectric converting portions 21 and 22 are transversely read out, a photoelectric signal may be obtained intermediately by an extension CCD portion 23, a high speed adjusting portion 24, a high speed reading-out portion 25 of parallel input and series output, a reading-out gate 26 and an amplifier 27.

In a telephoto mode wherein the central portion is read out, a transfer pulse is given from a line 28 and each picture element information is shifted in the rightward direction as viewed in FIG. 4. The central portion information of the small compartment sensor portion 10 is finely divided and therefore, in a form out of phase with respect to the information of a coarsely divided large compartment sensor portion 29, it reaches the high speed reading-out portion 25 during 3 to 5 clocks and 9 to 11 clocks in FIG. 4.

The high speed reading-out portion 25 serially transfers information to the reading-out gate 26 by a clock 28 and a high speed clock 30 and reads out it as a series signal. The reference numeral 31 denotes a line for operating a reset switch 32 through an AND gate 35 to thereby perform erasing operation in order to the mixing of each signal with the next signal after the reading out of each signal.

In the telephoto mode, the portion to be read out is the central portion alone and therefore, the time when there are 3 to 5 of clock 30 corresponds to the central portion information and thus, it will be proper if only the overlapping portion with the effective portion in the above-described clock 28 is regarded as information. What poses a problem is the time when receiving the image of the wide portion. That is, it forms a feature that the central portion information of the small compartment sensor portion 10 is collectively made into coarsely divided information.

The reference numeral 33 designates a circuit for generating a three-time clock. This circuit 33 gives a three-time clock to the transfer CCD of the central portion at the third and seventh of the clock 28 by a switch 34 to thereby send the small section of the central portion in the rightward direction as viewed in FIG. 4 in synchronism with the marginal large section. The transfer clock 36 of the high speed adjusting portion 24 is given in common with the margin, whereby the small section information of the central portion is sent into the high speed adjusting portion 24 by the three-time clock, and there it is charge-added and sent into the high speed reading-out portion 25 at the same timing as the marginal portion.

Hitherto, addition could be done in the horizontal direction of the small section shown, and the small section of "3×3" has become three-division information.

A switch 32 for effecting reading-out clear is usually cleared at each clock 30 in conformity with a signal 31, but in this case, prohibits a clear signal by the AND gate 35 during 3 to 5 of the clock 30, i.e., during a time corresponding to the small section, and reads out this three-section signal as a charge-added one component, whereby there can be obtained a signal when the small sections of the central portion are collectively made into the same compartment as the marginal portion.

Heretofore, all sections have been A/D-converted and only when it is necessary to collect them together, the central portion has been digitally added to thereby make a single signal, whereas this results in averagely thinning the error of A/D conversion, but has suffered from the disadvantage that an error such as offset is added.

In the present embodiment, addition is effected at a charge signal level, whereby large section information free of noise is obtained and the same reading-out as that of the outside section and A/D conversion can be effected without any level difference.

Figure 5:
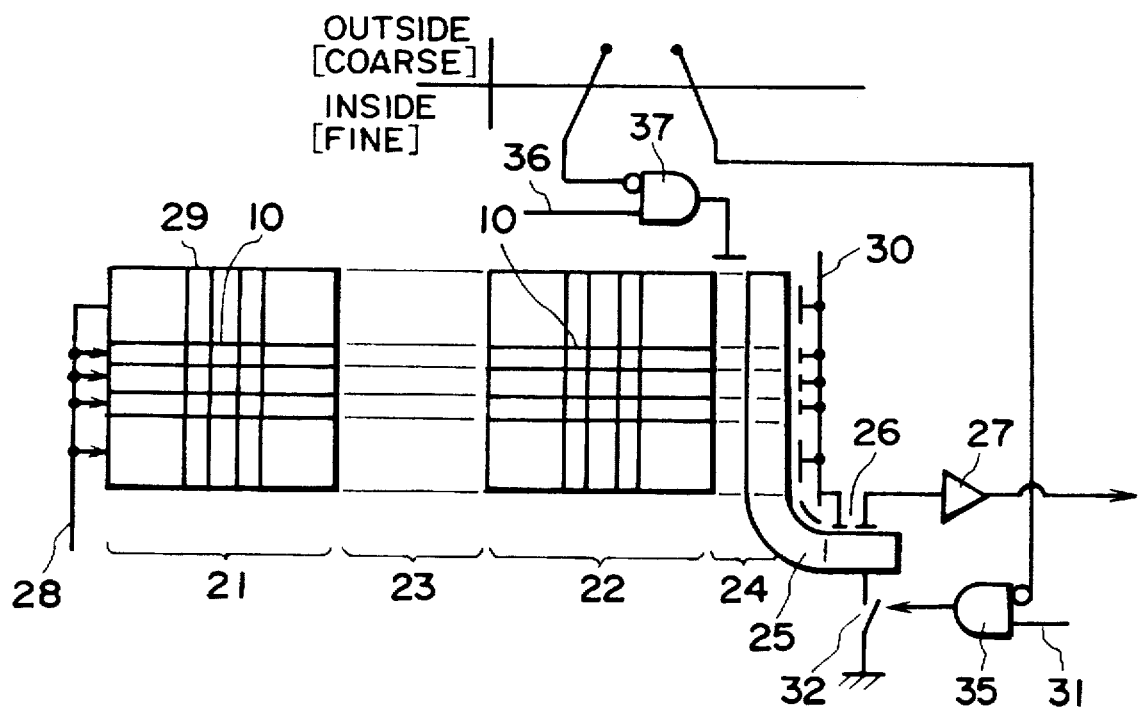
FIG. 5 is a view for illustrating another example of the reading-out control when a CCD is used as the sensor of FIG. 2.

FIG. 5 shows another example of the case of FIG. 4 in which even in the marginal portion, a location corresponding to the central portion (the large component sensor portion 29) is internally comprised of the same small divisions as those of the central portion, whereby when transfer is to be effected to the right as viewed in FIG. 5, the marginal portion may also be transferred in a similar manner (in synchronism).

Thus, this example is characterized in that even in the cutting-out in a large compartment, the clock 28 may be given in the central portion in a similar manner.

First, only the central portion is shifted to the right as viewed in FIG. 5 by the clock 28, and parallel-inputted information is series-transferred by the high speed reading-out portion 25 to thereby obtain the pertinent bit information by the reading-out gate 26. Regarding the large compartment information up to the marginal portion, it is necessary to effect the adding-up of the "3×3" small compartments of the central portion and the adding-up of the three compartments of the large compartment sensor portion 29 for taking synchronism with the central portion.

The vertically divided compartments in the sensor portions 10 and 29 as viewed in FIG. 5 are shifted to the right by the clock 28, but there is given a transfer signal resulting from the clock 36 synchronized in the high speed adjusting portion 24 being mastered by an AND gate 37 (at the timing of 2 to 4 and 8 to 10, whereat the divided section comes). Thereby, information corresponding to this section is added, and then is parallel-inputted to the high speed reading-out portion 25.

Subsequently, in the high speed reading-out portion 25, by the reset switch 35 being operated as in the aforedescribed example, the small compartment information of the central portion is added and made into one-compartment information called the central portion by the reading-out gate 26.

While in the above-described embodiment, the addition of the compartment information is effected by the clock control of the high speed adjusting portion 24, wrong mixing of the information with the high speed reading-out portion 25 can be prevented more completely by using it with the operation of the gate portion from the high speed adjusting portion 24 to the high speed reading-out portion 25.

Figure 6:
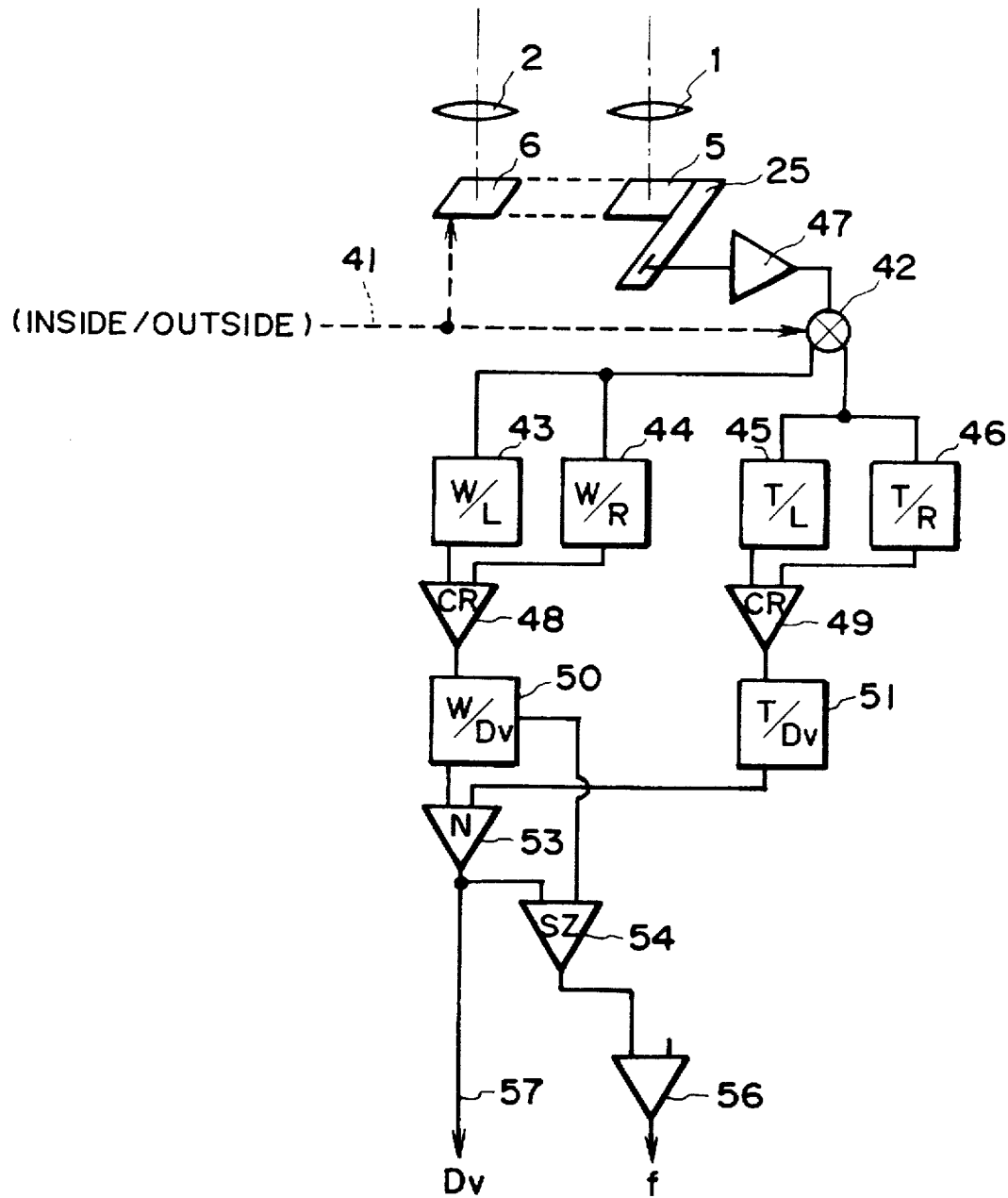
FIG. 6 is a block diagram schematically showing the construction of an automatic zoom apparatus according to an embodiment of the present invention.

FIG. 6 shows an embodiment of object recognition and automatic zoom.

Object images having a parallax are formed on photoelectric converting portions 5 and 6 by phototaking lenses 1 and 2, and are A/D-converted by an A/D converter 47.

So, as shown in FIGS. 4 and 5, "make coarse up to the margin" and "make the central portion detailed" are changed over by a line 41, and in conformity therewith, each of the wide left eye information (photoelectric converting portion 5 side) 43, the wide right eye information (photoelectric converting portion 6 side) 44, the detailed left eye information 45 and the detailed right eye information 46 is obtained as data by a changeover device 42 still after the A/D conversion.

The reference numerals 48 and 49 denote correlation calculators which find angle of field and distance data (=correlation phase value) from a pair of angle of field and luminance data, and store them into memories 50 and 51. What is designated by the reference numeral 53 extracts the corresponding shortest distance data of the two distance data, and automatically controls the focuses of the phototaking lenses by a line 57 on the basis of this data. Subsequently, at SZ, the reference numeral 54, the region area of this distance data is counted (found). Then, a focal length for which this area becomes a predetermined proportion (e.g. 50%) of the image field is calculated by an operational amplifier 56, and automatic zoom is effected to that focal length.

This recognition is characterized in that if there is an object of the same distance at a corresponding position on a wide angle image field and a narrow angle image field, it is judged as the main object. That is, it is based on the idea that when a photographing apparatus is turned toward an object, the whole or a part of the object is ought to be substantially at the center (within a narrow angle).

Accordingly, the focus is determined on the basis of this distance. Also, the focal length (the angle of field) is automatically controlled so that the image of this object (the object of the same distance) may have a predetermined area ratio.

According to the above-described embodiment, there becomes possible, 1) photoelectric conversion for object field information extraction which changes over, 2) coarse information for a wide angle and detailed information of the central portion, 3) while keeping the positional relation between the optical system including the distance measuring system and the photoelectric conversion element, 4) by the use of the area sensor, 5) in a form in which the occurrence of noise is prevented as in charge addition and 6) by purely electronic means such as the changeover of the sensor clock.

The foregoing is the relation of correspondence between the constructions of the embodiments and the construction of the present invention, whereas the present invention is not restricted to the contractions of these embodiments, but may of course assume any construction which can achieve the functions shown in the appended claims or the functions the embodiments have.

While the present invention has been described as being applied to a photographing apparatus such as a single-lens reflex camera, a lens shutter camera or a video camera, it can also be applied to other optical apparatuses and other apparatuses, and further as a construction unit.

As described above, according to the present invention, the area sensor is made different in picture element pitch between the central portion and the marginal portion (the marginal portion is made to have a coarse picture element pitch since it is not very meaningful even if the picture element pitch is made fine because the performance of the optical system is limited, and the central portion is made to have a dense picture element pitch) and the changeover of the respective picture elements is electronically effected by the reading-out means so that two kinds of object field information (detailed information and coarse information) may be obtained from the area sensor.

Consequently, a desired one of two kinds of object field information can be obtained while the occurrence of noise is prevented.

What is claimed is:

1. An optical apparatus comprising:
   an objective lens; and
   an area sensor disposed at a position of an image formed by said objective lens and comprising a plurality of picture elements and constructed with a picture element pitch of a central portion made finer than a picture element pitch of a marginal portion.

2. An optical apparatus according to claim 1, wherein a speed for reading out the picture elements of the central portion and a speed for reading out the picture elements of the marginal portion are made different.

3. An optical apparatus comprising:
   a pair of area sensors each comprising a plurality of picture elements and in which a picture element pitch of a central portion is made finer than a picture element pitch of a marginal portion,
   a pair of optical systems disposed with a predetermined base length for directing a light beam to said pair of area sensors,
   reading-out means for reading out outputs of said area sensors, and
   zoom information calculating means for controlling said reading-out means to use picture elements of the marginal portion and each picture element of the central portion of said area sensors as a picture element during a wide angle operation, to thereby obtain coarse information of an object field, and controlling said reading-out means to use each picture element of the central portion during a telephoto operation to thereby obtain detailed information and to calculate zoom information.

4. An optical apparatus according to claim 3, further provided with focus information calculating means for calculating the then focus information based on the information read out by said reading-out means.

5. An optical apparatus comprising:

an objective lens; and an area sensor disposed at a position near an image formed by said objective lens so as to photoelectrically convert the image, said area sensor including a region having a coarse picture element pitch and a region having a fine picture element pitch.

6. An optical apparatus according to claim 5, wherein the region of the fine picture element pitch is a central portion of said area sensor, and the region of the coarse picture element pitch is a marginal portion of said area sensor.

7. An optical apparatus according to claim 6, further comprising reading-out means for reading out the picture elements with different reading-out speeds between the central portion and the marginal portion.

8. An optical apparatus according to claim 5, wherein said optical apparatus is a camera, and said camera comprises changing means for changing a picture element region for use depending on a state of a phototaking operation.

9. An optical apparatus according to claim 8, wherein said changing means causes reading out whole picture element regions during a wide angle phototaking operation and the region of the fine picture element pitch during a telephoto-taking operation.

10. An optical apparatus according to claim 5, further comprising reading-out means configured to add outputs of a plurality of picture elements to be read out, when the region of the fine picture element pitch is read out.

11. An optical apparatus according to claim 5, further comprising reading-out means configured to add outputs of a plurality of picture elements to be read out, when the picture elements of the central portion are read out.

* * * * *